United States Patent [19]

Nakamura et al.

[11] 3,887,435

[45] June 3, 1975

[54] METHOD OF PRODUCING YEAST CELLS

[75] Inventors: Junji Nakamura; Shigeyoshi Miyashiro; Hiroshi Okada, all of Tokyo, Japan

[73] Assignee: Ajinomoto Co., Inc., Tokyo, Japan

[22] Filed: Feb. 7, 1974

[21] Appl. No.: 440,291

[30] Foreign Application Priority Data
Feb. 14, 1973 Japan.................................. 48-18004

[52] U.S. Cl..................................... 195/82; 195/30
[51] Int. Cl............................................. C12c 11/08
[58] Field of Search................................ 195/30, 82

[56] References Cited
UNITED STATES PATENTS

| | | | |
|---|---|---|---|
| 3,619,368 | 11/1971 | Woldendorf.......................... | 195/82 |
| 3,733,253 | 5/1973 | Suzuki et al. ......................... | 195/30 |

*Primary Examiner*—Alvin E. Tanenholtz
*Attorney, Agent, or Firm*—Hans Berman; Kurt Kelman

[57] ABSTRACT

Many yeasts are capable of growing in culture media which contain propionate and n-butyrate ions as the principal or the sole significant source of carbon. Propionic and butyric acid are waste products of the petrochemical industry, and the yeast cells are a valuable feed supplement.

6 Claims, No Drawings

METHOD OF PRODUCING YEAST CELLS

This invention relates to the production of yeast cells, and more particularly to a method of producing yeast cells from a novel carbon source.

Yeast cells provide a valuable protein supplement for cattle and chicken feed. Some yeasts are known to grow on culture media in which petroleum hydrocarbons in the gaseous or liquid state provide the principal carbon source, and such carbon sources are generally less costly than carbohydrates, the most common previous source of assimilable carbon.

It has now been found that many yeasts are capable of growing and multiplying on otherwise conventional culture media in which ions of propionic acid and butyric acid provide the principal or the only significant source of assimilable carbon. Propionic acid and butyric acid are by-products of the petrochemical industry for which very few commercial outlets are available at this time so that a large portion of the propionic and n-butyric acid produced by the petrochemical industry is discharged as a waste material which may present a disposal problem.

Propionic acid is medicinally employed as a fungicide, and it is surprising that it should be converted to yeast cell substance at excellent yields. Yet, many yeast strains have been found capable of utilizing propionic acid and n-butyric acid, while the growth of the same strains on isobutyric acid and on the higher alkanoic acids is usually disappointingly low. All the yeast strains capable of growing on propionic and n-butyric acid are also capable of utilizing the relatively expensive acetic acid as a carbon source. Yeasts capable of converting propionic and butyric acid in economically significant amounts to yeast cell solids were found in the genera Saccharomyces, Pichia, Candida, Hansenula, Debaryomyces, Trichosporon, Endomycopsis, and Kluyveromyces. They include:

| | |
|---|---|
| Candida maltosa AJ 4718 | FERM P-733 |
| Candida lipolytica AJ 4549 | FERM P-1863 |
| Saccharomyces cerevisiae AJ 4005 | FERM P-1859 |
| Saccharomyces carlsbergensis AJ 4033 | FERM P-1860 |
| Pichia etchellsii AJ 5554 | FERM P-1585 |
| Pichia ohmeri AJ 5085 | FERM P-1866 |
| Debaryomyces vanriji AJ 5058 | FERM P-1865 |
| Debaryomyces hansenii AJ 4179 | IFO 0023 |
| Endomycopsis burtonii AJ 4275 | FERM P-1861 |
| Kluyveromyces polysporus AJ 4278 | FERM P-1862 |
| Trichosporon fermentas AJ 5152 | FERM P-1867 |
| Hansenula anomala AJ 5027 | FERM P-1864 |

The microorganisms identified above by FERM P numbers are available freely from the Fermentation Research Institute, Agency of Industrial Science and Technology, of the Ministry for Industrial Trade and Industry, Chiba, Japan, and the strain identified by an IFO number is available from the Institute for Fermentation, Osaka, Japan.

The culture media employed for growing cells of these yeasts are conventional except for the presence of the alkanoic acids. The latter may be incorporated in the culture medium prior to inoculation or they may be added gradually during culturing to maintain a uniform concentration of propionate and butyrate ions.

The assimilable nitrogen source necessary for growth of the yeasts may be provided by ammonium salts (ammonium sulfate, chloride, phosphate, carbonate), urea, gaseous ammonia, or ammonium hydroxide solution. Sources of phosphate ions also should be present ($KH_2PO_4$, $K_2HPO_4$, $Na_3PO_4$, etc.). Minor organic nutrients, such as vitamins and amino acids, may be supplied in the form of corn steep liquor, peptone, meat extract, malt extract, yeast extract, and soybean protein hydrolyzate.

The culture medium should be slightly acidic or neutral. An increase of the pH during culturing may be counteracted by adding sulfuric acid, hydrochloric acid, propionic acid, or n-butyric acid. The microorganisms are aerobic. They may grow between 23° and 40°C, and temperatures of 25° to 34°C are usually best. The yeast cells are recovered from the broth by centrifuging and/or filtering. Because both propionic acid and butyric acid are water-soluble, the recovered cells are readily purified by washing with water. The yield of cell substance based on the alkanoic acid consumed is 40% or better.

The following Examples further illustrate the invention. The microorganisms identified in the Examples by genus and species were the specific strains enumerated above.

EXAMPLE 1

C.maltosa, D.hansenii, P.ethellsii, N.anomala, T.fermentas, and S.carlsbergensis were cultured on agar slants (10 g/l yeast extract, 10 g/l malt extract, 5 g/l NaCl, 20 g/l agar) at 30°C for 24 hours, and a loopful of each seed culture so produced provided an inoculum for respective 20 ml batches of culture media containing 5 g/l alkanoic acid, as listed in Table I, 5 g/l $(NH_4)_2SO_4$, 2 g/l $KH_2PO_4$, 1 g/l $MgSO_4$, 1 g/l meat extract, and 10 ml/l corn steep liquor (pH 6.0) which had been sterilized in 500 ml shaking flasks. Each medium was held at 28°C for 48 hours with shaking, and the growth of each yeast was estimated by measuring the optical density of the culture medium, diluted 26 times with water, at 560 mu. The measurements are listed in Table I for each combination of the six microorganisms and nine carbon sources tested. The optical density of each freshly inoculated culture, when determined in the same manner, was 0.02.

EXAMPLE 2

A seed culture of S.cerevisiae was prepared at 31°C, but otherwise as in Example 1, and a loopful was used as an inoculum in 20 ml of an aqueous culture medium containing 5 g/l sodium propionate, 5 g/l $(NH_4)_2SO_4$, 2 g/l $KH_2PO_4$, 1 g/l $MgSO_4$, 1 g/l meat extract, 10 ml/l corn steep liquor, and 5 ppm each of $FE^{++}$, $Mn^{++}$, and $Zn^{++}$ (pH 6.0), which had been sterilized in a 500 ml shaking flask.

The culture was kept at 28°C for 48 hours with shaking while propionic acid was added at a rate to maintain a slightly acidic condition. The yeast cells were then harvested by centrifuging, washed twice with distilled water, and freeze-dried. Dry cell material in an amount of 94 mg was obtained. The yield based on the total propionic acid consumed was 45%.

C.lipolytica, under the same conditions, yielded 352 mg dry cell substance for a yield of 59.4%, based on the propionic acid consumed.

C.maltosa yielded 224 mg dry cell material for a yield of 64.6%, based on consumed propionic acid.

EXAMPLE 3

P.etchellsii, P.ohmeri, D.vanriji, E.burtonii, K.polysporus, T.fermentas, H.anomala, and S.carlsbergensis were cultured substantially as in Example 2 at 28°C. for 3 days, and the cells were harvested and freeze-dried. The dry cell material recovered amounted to 64 mg, 56 mg, 48 mg, 44 mg, 40 mg, 60 mg, 56 mg, and 66 mg, respectively, in the order in which the microorganisms are listed in this Example.

EXAMPLE 4

Seed cultures of C.maltosa, P.etchellsii, H.anomala, T.fermentas, S.carlsbergensis, D.hansenii, E.burtonii, and K.polysporus were prepared as in Example 2 and inoculated on respective 20 ml batches of a culture medium containing 5 g/l n-butyric acid, 5 g/l, $(NH_4)_2SO_4$, 2 g/l $KH_2PO_4$, 1 g/l $MgSO_4$, 1 g/l meat extract, and 10 ml/l corn steep liquor (pH 6.0). Each culture was incubated at 28°C with shaking for 60 hours while n-butyric acid was added to maintain slightly acidic conditions.

The cells were harvested by centrifuging, washed twice with distilled water, and freeze-dried. The yields of dry cell material so obtained in milligrams and in percent of the total n-butyric acid consumed are listed in Table II.

TABLE II

| Yeast | Yield of dry cell material | |
|---|---|---|
| | Mg | Percent |
| C.maltosa | 244 | 62.3 |
| P.etchellsii | 148 | 51.2 |
| H.anomala | 90 | 55.0 |
| T.fermentas | 208 | 59.1 |
| S.carlsbergensis | 70 | 45.0 |
| D.hansenii | 84 | 40.0 |
| E.burtonii | 75 | 38.5 |
| K.polysporus | 90 | 42.4 |

TABLE III

| Yeast | Yield, mg |
|---|---|
| C.maltosa | 290 |
| P.etchellsii | 156 |
| H.anomala | 136 |
| T.fermentas | 118 |
| S.carlsbergensis | 250 |
| D.hansenii | 90 |

As is evident from Example 1, useful amounts of yeast cells can also be produced from isobutyric acid and higher alkanoic acids up to nine carbon atoms according to this invention. However, these other acids are not available at this time at attractive cost, their yields are lower than those obtained from propionic acid and n-butyric acid in almost all instances, and their solubility in water decreases quickly with increasing number of carbon atoms, making purification of the harvested cells less simple. Propionic and n-butyric acid are greatly preferred for this reason.

In view of the ready availability of propionic acid and n-butyric acid at low cost, it is not attractive to combine the alkanoic acids as carbon sources with more conventional sources such as carbohydrates. However, the microorganisms capable of metabolizing the alkanoic acids, particularly propionic and n-butyric acid, can convert them to cell material also in the presence of conventional carbon sources, such as molasses or starch hydrolyzate.

TABLE I

| Strain | Acetic | Propionic | n-Butyric | i-Butyric | Acid n-Valeric | Caproic | Heptanoic | Caprylic | Pelargonic |
|---|---|---|---|---|---|---|---|---|---|
| C.maltosa | 0.43 | 0.36 | 0.33 | 0.15 | 0.10 | 0.10 | 0.10 | 0.10 | 0.10 |
| D.hansenii | 0.355 | 0.28 | 0.15 | 0.09 | 0.08 | 0.09 | 0.09 | 0.09 | 0.09 |
| P.etchellsii | 0.52 | 0.25 | 0.185 | 0.08 | 0.08 | 0.08 | 0.08 | 0.08 | 0.09 |
| H.anomala | 0.41 | 0.305 | 0.15 | 0.10 | 0.17 | 0.12 | 0.11 | 0.10 | 0.11 |
| T.fermentus | 0.35 | 0.245 | 0.19 | 0.08 | 0.19 | 0.11 | 0.13 | 0.11 | 0.10 |
| S.carlsbergensis | 0.34 | 0.205 | 0.115 | 0.08 | 0.08 | 0.07 | 0.09 | 0.08 | 0.07 |

EXAMPLE 5

Seed cultures of the six strains referred to in Example 1 were prepared as in that Example and inoculated on respective, sterilized, 20 ml batches of a culture medium containing 1 g/l each of acetic, propionic, and n-butyric acid, 0.5 g/l each of valeric, caproic, heptanoic, caprylic, and pelargonic acid, 5 g/l $(NH_4)_2SO_4$, 2 g/l $KH_2PO_4$, 1 g/l $MgSO_4$, 1 g/l meat extract, and 10 ml/l corn steep liquor (pH 6.0).

Each medium was shaken in a 500 ml flask at 28°C for 60 hours while being kept slightly acidic by means of an aqueous solution of equal volumes of acetic, propionic, and n-butyric acid, adjusted to pH 4.0 with sodium hydroxide solution.

The cells were harvested by centrifuging, washed twice with distilled water, and freeze-dried. The yields of dry cell material are listed in Table III.

What is claimed is:

1. A method of producing yeast cells which comprises:
   a. culturing a yeast strain capable of assimilating propionate ions and n-butyrate ions in an aqueous culture medium containing propionate ions, n-butyrate ions, or propionate and n-butyrate ions as the principal source of assimilable carbon, as assimilable source of nitrogen, inorganic salts, and minor organic nitrients until the cells of said strain multiply in said culture medium; and
   b. recovering the multiplied cells from said medium.

2. A method as set forth in claim 1, wherein said ions constitute the sole significant source of assimilable carbon in said medium.

3. A method as set forth in claim 1, wherein said yeast strain is of one of the genera Saccharomyces, Pichia, Candida, Hansenula, Debaryomyces, Trichosporon, Endomycopsis, and Kluyveromyces.

4. A method as set forth in claim 1, wherein said strain is Candida maltosa FERM P-733, Candida lipolytica FERM P-1863, Saccharomyces cerevisiae FERM P-1859, Saccharomyces carlsbergensis FERM P-1860, Pichia etchellsii FERM P-1585, Pichia ohmeri FERM P-1866, Debaryomyces vanriji FERM P-1865, Debaryomyces hansenii IFO 0023, Endomycopsis burtonii FERM P-1861, Kluyveromyces polysporus FERM P-1862, Trichosporon fermentas FERM P-1867, or Hansenula anomala FERM P-1864.

5. A method as set forth in claim 1 wherein said strain is Saccharomyces cerevisiae FERM P-1859, Saccharomyces carlsbergensis FERM P-1860, Pichia etchellsii FERM P-1585, Pichia ohmeri FERM P-1866, Debaryomyces vanriji FERM P-1865, Debaryomyces hansenii IFO 0023, Endomycopsis burtonii FERM P-1861, Kluyveromyces polysporus FERM P-1862, Trichosporon fermentas FERM P-1867, or Hansenula anomala FERM P-1864.

6. A method as set forth in claim 1, wherein said strain is Candida maltosa FERM P-733 or Candida lipolytica FERM P-1863.

* * * * *

UNITED STATES PATENT OFFICE
CERTIFICATE OF CORRECTION

PATENT NO. : 3,887,435
DATED : June 3, 1975
INVENTOR(S) : JUNJI NAKAMURA ET AL

It is certified that error appears in the above-identified patent and that said Letters Patent are hereby corrected as shown below:

Column 4, line 58 change "as" to -- an --.

Signed and Sealed this fifth Day of August 1975

[SEAL]

Attest:

RUTH C. MASON
*Attesting Officer*

C. MARSHALL DANN
*Commissioner of Patents and Trademarks*